United States Patent [19]
Mueller et al.

[11] Patent Number: 5,458,364
[45] Date of Patent: Oct. 17, 1995

[54] INFLATOR SECURED IN DIFFUSER HOUSING OF AIRBAG MODULE ASSEMBLY BY LOCKING END CAP

[75] Inventors: Louis A. Mueller, Harrisville; Rick L. Halford, Midvale; Larry D. Rose, Layton, all of Utah

[73] Assignee: Morton International, Inc., Chicago, Ill.

[21] Appl. No.: 293,843

[22] Filed: Aug. 22, 1994

[51] Int. Cl.$^6$ .................................................. B60R 21/26
[52] U.S. Cl. ........................ 280/728.2; 280/740; 280/736
[58] Field of Search .............................. 280/728 A, 736, 280/740, 741, 742, 737, 728.2

[56] References Cited

U.S. PATENT DOCUMENTS

| | | | |
|---|---|---|---|
| 4,370,930 | 2/1983 | Strasser et al. | 102/530 |
| 4,890,860 | 1/1990 | Schneiter | 280/741 |
| 4,964,654 | 10/1990 | Bishop et al. | 280/728 A |
| 5,022,674 | 6/1991 | Frantom et al. | 280/741 |
| 5,116,080 | 5/1992 | Wipasuramonton | 280/741 |
| 5,131,679 | 7/1992 | Novak et al. | 280/736 |
| 5,152,549 | 10/1992 | Aird | 280/728 A |
| 5,189,255 | 2/1993 | Fukabori et al. | 102/531 |
| 5,213,362 | 5/1993 | Coultas | 280/736 |
| 5,221,109 | 6/1993 | Marchant | 280/736 |
| 5,269,560 | 12/1993 | O'Loughlin et al. | 280/736 |
| 5,308,108 | 5/1994 | Rion | 280/728 A |
| 5,340,147 | 8/1994 | Fontecchio et al. | 280/728 A |
| 5,378,015 | 1/1995 | Rink et al. | 280/736 |

FOREIGN PATENT DOCUMENTS 5065048  3/1993  Japan ........................ 280/728 A

*Primary Examiner*—Margaret A. Focarino
*Assistant Examiner*—Peter C. English
*Attorney, Agent, or Firm*—George W. Rauchfuss, Jr.; Gerald K. White

[57] ABSTRACT

An airbag module assembly comprises a reaction canister, an airbag inflator, a locking end cap for positioning and retaining the airbag inflator, a module diffuser housing, and an inflatable airbag. The airbag inflator is fixedly secured to the end cap and the end cap has at least one latch which allows the inflator-end cap unit to be fastened to the module diffuser housing. The end cap rigidly retains the inflator in the module diffuser housing, avoiding the need for a secondary restraint. This invention eliminates the need for exterior retention brackets and studs to directly secure the airbag inflator in the reaction canister.

20 Claims, 2 Drawing Sheets

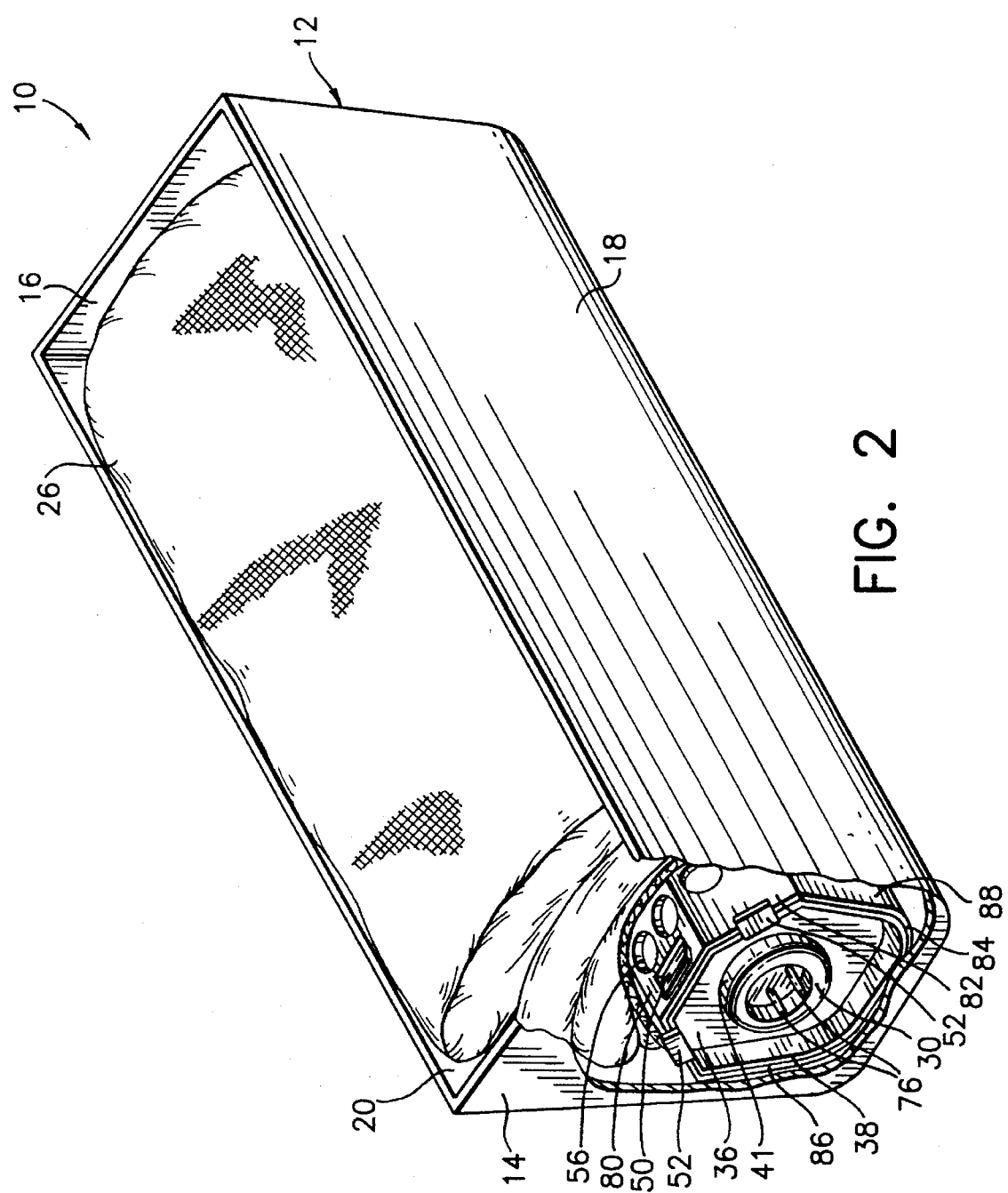

INFLATOR SECURED IN DIFFUSER HOUSING OF AIRBAG MODULE ASSEMBLY BY LOCKING END CAP

FIELD OF THE INVENTION

The present invention relates to an inflatable vehicle occupant restraint. More specifically, this invention relates to an apparatus for securing a hybrid airbag inflator within an airbag module assembly.

BACKGROUND OF THE INVENTION

The use of airbags has increased dramatically in the past decade. Federal automobile safety mandates have spurred the rapid growth in airbag production and required use. Airbags are presently being used as supplemental restraint systems for both the driver's and passenger's sides of an automobile. In the past, inflators generally relied solely on the pyrotechnic action to inflate the airbags. Recently, automobile manufacturers have begun using hybrid inflators as the inflators of choice in the restraint systems. Hybrid inflators use a pyrotechnic device to release compressed gas and this gas in turn inflates the airbag. The hybrid inflator, by adding the use of compressed air, has markedly improved airbag safety and performance.

In order for an airbag to work effectively, the airbag inflator must be securely fastened to or retained in its reaction canister. In the past, pyrotechnic type passenger side airbag inflators have been secured by a variety of secondary restraint devices, a stud and nut device being one of the more popular means of securing these inflators. Many airbag inflators are also secondarily secured by brackets placed exteriorly to the reactor canister in conjunction with such a stud and nut device. The stud and nut device has introduced several new problems, particularly when a hybrid inflator is employed. First and foremost, welding the stud and nut device to the hybrid inflator has proven to be a very time consuming task. The stud must be welded to a high-gauge steel base of the inflator. Those adept in the art can readily understand the difficulty of achieving a sufficiently strong and structurally sound weld on such a high-gauge steel base and why a high scrap rate has resulted during production thereof.

There are other concerns with current module assemblies. The stud and nut arrangement, when welded to such a base of a hybrid inflator, is subjected to a variety of shearing forces due to its location at the end of the reaction canister. Upon deployment of the airbag there is a substantial force applied to the stud and nut which secure the airbag inflator in the airbag module assembly.

Therefore an object of this invention is to eliminate the need for employing a stud and nut arrangement for retention of an inflator in a module diffuser housing. A still further object of the invention is to eliminate the need for a secondary retention bracket to retain an inflator in a module diffuser housing. It is yet another object of this invention to provide a means to retain a hybrid inflator in a module diffuser housing without the need for secondary restraint mechanisms and to permit hybrid inflators to be employed in current airbag module assemblies that previously housed pyrotechnic inflators, without the requirement for any significant modification of the airbag module assembly components.

SUMMARY OF THE INVENTION

The present invention relates to an airbag module assembly for use in a vehicle. According to the present invention, the airbag module assembly includes an airbag canister, hybrid airbag inflator, locking end cap, module diffuser housing, means for attaching the module diffuser housing to the airbag canister and an inflatable airbag. The airbag canister is a trough shaped housing with two end walls, two sidewalls, and a floor. The canister is open-mouthed for storage of an inflatable airbag and for deployment thereof. The hybrid airbag inflator is a substantially cylindrical steel container, that has a gas diffusing end. During production of the airbag module assembly the gas diffusing end of the hybrid airbag container is fixedly secured to the locking end cap. The end cap is skirted and contains a centrally located cupped orifice. The skirt of the end cap has a plurality of projections located therein for attaching to and positioning on the module diffuser housing.

After fixedly securing the end cap to the hybrid airbag inflator, the inflator is placed longitudinally in the module diffuser housing so that it is substantially encircled along its full length by the module diffuser housing. The module diffuser housing is generally a stamped metal sheet with a plurality of gas outlet openings to permit the inflation gases from the inflator to be distributed into the airbag. The end cap, with its plurality of projections on its skirted surface, is attached to the module diffuser housing. The module diffuser housing, hybrid inflator, and the end cap, which are all fixedly attached to each other, are fixedly secured to the floor of the canister by a fastening means, such as threaded bolts and nuts associated with the module diffuser housing.

This invention has dramatically improved the manufacturing of the airbag module assembly. The airbag module assembly incorporates a new locking end cap, which allows the inflator to be secured directly to the module diffuser housing, thus avoiding the need for both the previously employed stud and nut arrangement and a secondary retaining bracket attached to the outside of the reaction canister.

The module diffuser housing is fastened to the floor of the canister. Therefore, upon activation of the inflator, the bolts attaching the module diffuser housing to the canister floor primarily are subjected to a primarily tensile force. In the prior art assemblies, the stud and nut arrangement, which fastened the inflator into the reaction canister was subjected primarily to shear forces. Since bolts are generally able to withstand higher tensile force loads than shearing loads, it is safer to subject the module diffuser housing bolts to the tensile forces created by deployment of the inflator in the new assembly of this invention, rather than allowing the previously employed stud and nut arrangement to be damaged by shearing forces. Valuable time and money is saved by eliminating the need for a welded stud and nut arrangement on the end of the inflator. This new invention will increase the efficiency of airbag module assembly production. In summary this new invention is a more inexpensive way to harness a hybrid inflator in an airbag module assembly.

BRIEF DESCRIPTION OF THE DRAWINGS

The following specific embodiment of an airbag module assembly of this invention is illustrated by the drawings in which:

FIG. 2 is a perspective view of an airbag module assembly

DETAILED DESCRIPTION OF THE DRAWINGS

Figure 1:
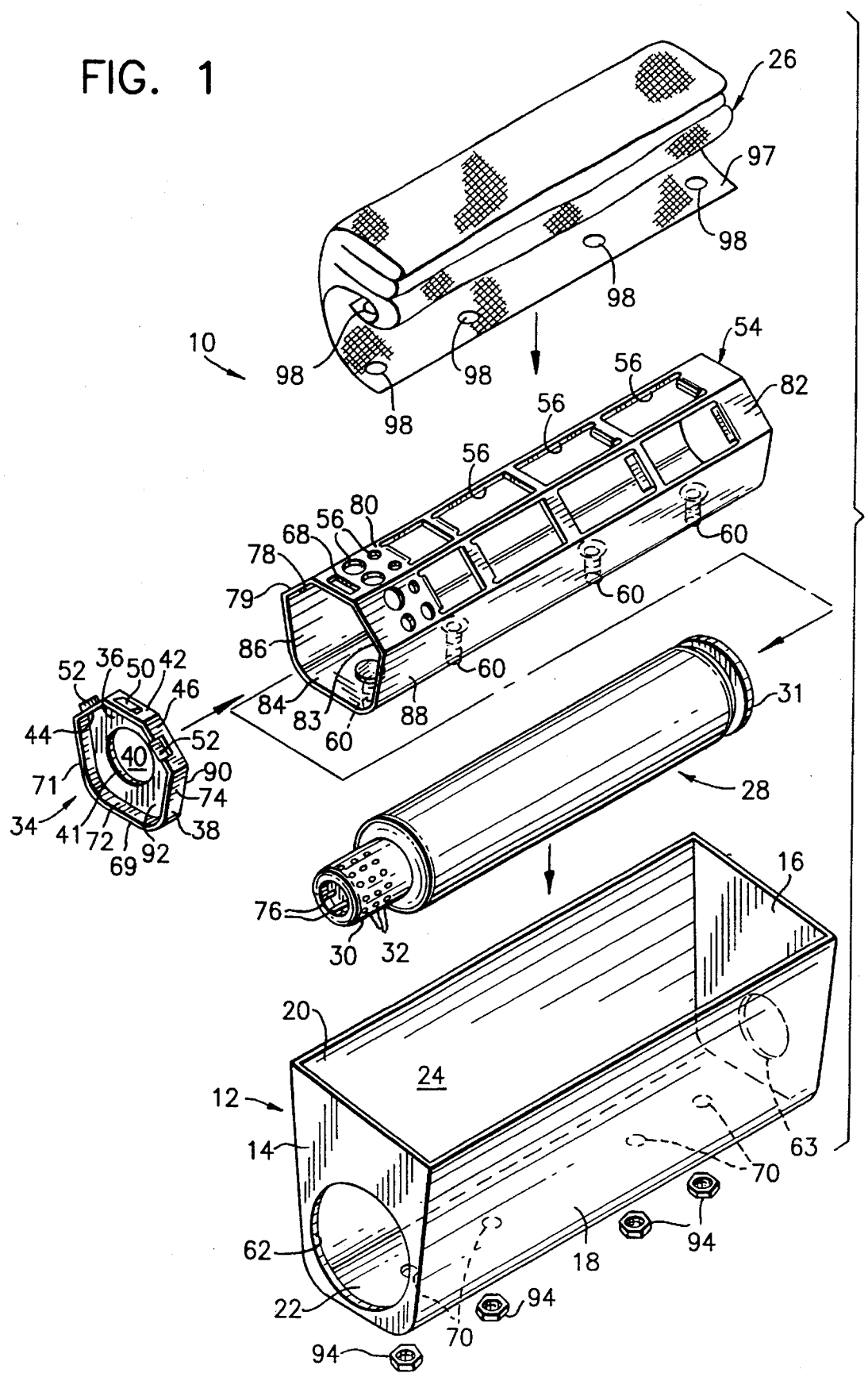
FIG. 1 is an exploded view of the various component parts of an airbag module assembly of this invention.

An airbag module assembly, indicated generally by the reference numeral 10 is shown in FIG. 1 and FIG. 2. The airbag module assembly 10 of this invention generally comprises a reaction canister 12, an airbag inflator 28, an end cap 34, a module diffuser housing 54, and an inflatable airbag 26.

The reaction canister 12 is trough shaped having a first end wall 14, second end wall 16, first sidewall 18, second sidewall 20, and a floor 22 defining an opened mouthed area 24 for storage and deployment of an inflatable airbag 26. The first and second end walls 14 and 16 are each provided with openings 62 and 63, respectively, for purposes mentioned hereinafter. The floor 22 of the canister 12 is provided with a plurality of openings or holes 70, generally about four, for receiving fastening means 60, such as stud bolts or the like, associated with the module diffuser housing 54. The reaction canister 12 is generally a pressed metal reaction canister.

The inflator 28 is an essentially cylindrical hybrid inflator of known construction. One end 30 of the inflator 28 is a gas diffusing end 30 provided with a plurality of radially oriented orifices 32 for release of gas from the inflator. Also housed within said gas diffusing end 30 is an ignitor (not shown) provided with male electrical leads 76 accessible through opening 62 in end wall 14 for connection to female electrical leads from a deceleration sensor (not shown) of a vehicle. The other end 31 of inflator 28 has leads accessible through opening 63 of end wall 16 for connection of a low pressure sensor (not shown).

Inflator 28 is received in a generally hexagonally shaped module diffuser housing 54 which generally encircles or envelopes the entire length of the cylindrical inflator. Housing 54 is generally a stamped metal sheet usually formed into essentially a hexagonal shape. The module diffuser housing 54 extends generally longitudinally along substantially the entire longitudinal length of the reaction canister sidewalls 18 and 20 between end walls 14 and 16. Three sides 78, 80, 82 of the hexagonally shaped module diffuser housing 54 facing generally upwardly toward the open mouth 24 of the reaction canister 12 are provided with a plurality of gas diffusing apertures 56 for directing flow of inflation gas from inflator 28 into airbag 26. The remaining three sides 84, 86, and 88 of the hexagonally shaped module diffuser housing 54 conform generally to the shape of sidewalls 18 and 20 and the canister floor 22. The side 84 of the diffuser housing 54 generally conforming with the shape of the canister floor 22, is provided with a plurality of stud bolts 60, generally about four, for insertion through holes 70 in said canister floor for fastening or retaining the module diffuser housing 54 in the canister 12. At least one of the three upwardly facing module diffuser housing sides 78, 80, or 82, preferably uppermost side 80, is provided with a securing opening 68 for receiving and firmly securing a locking tab 50 located on end cap adapter 34. When housing 54 is placed in canister 12 securing opening 68 will be essentially adjacent end wall 14.

Prior to insertion of inflator 28 longitudinally within module diffuser housing 54, locking end cap 34 is fixedly attached, such as by welding, to gas diffusing end 30 of the inflator. The end cap 34 comprises a planar element 36 having a top face or surface 90 and a bottom face or surface 92 and having a generally hexagonally shaped perimeter or periphery conforming generally to the interior of the outline shape of an end of the module diffuser housing 54. A cupped generally circular opening 40 is located essentially centrally in the planar element 36. Around the entire periphery of the planar element 36 of end cap 34 a skirted surface 38 extends generally perpendicularly from surface 90. Said peripheral skirt surface 38 fits snugly within an open end of the module diffuser 54. Circular orifice 40 has a cupped circumferential perimeter surface 41 extending from surface 90 in the same general direction as skirt element 38, but tapering slightly radially inwardly for securely engaging gas diffusing end 30 of inflator 28. Three adjoining sides 71, 72 and 74 of skirt surface 38 form a portion 69 of the generally hexagonal shaped skirt surface conforming generally to the shape of the sidewalls 18 and 20 and floor 22 of reaction canister 12. Adjoining sides 68 and 74 of skirt 38 at each end of skirt portion 69 are essentially flat skirt sides 44 and 46, respectfully, joined at their distal ends by skirt side 42. Said sides 44, 46, and 42 conform to the general size (width) of sides 78, 82 and 80, respectfully, of hexagonally shaped diffuser housing 54, so as to snugly fit within the diffuser housing. At least one of the sides, generally side 42 of skirt 38, has a locking tab or hook element 50, generally an L-shaped tab, projecting radially outwardly transverse to skirt 38, for suitable locking engagement with securing opening 68 of module diffuser housing 54. Preferably securing opening 68 and locking tab 50 are located on side 80 of housing 54 and on skirt side 42 of end cap 34, respectively. Skirt sides 44 and 46 are both preferably provided with radially outwardly extending projections 52 for engaging with the edges 79 and 83 of sides 78 and 82 of the module diffuser housing 54 to position and retain locking tab 50 in securing opening 68. End cap 34 is generally a sheet metal stamped end cap of the hereinbefore described size, features and characteristics.

The gas diffusing end 30 of inflator 28 is inserted through cupped circular opening 40 of end cap 34 and cupped surface 41 is welded to the inflator to fixably attach the end cap to the inflator. After fixedly securing end cap adapter 34 to the gas diffusing end 30 of inflator 28, the inflator with attached end cap is placed longitudinally within the hexagonally shaped diffuser housing 54 and locking tab 50 placed in and secured in mating securing opening 68 with end cap 34 snugly press fitted into an end of the module diffuser housing. Then folded airbag 26 is similarly attached to the module diffuser housing 54 and canister 12 by means of appropriate holes 98 at the edges of the mouth 97 of airbag which holes are also placed on stud bolts 60. This assembled subunit is then placed longitudinally in reaction canister through mouth 24, with gas diffusing end 30 of inflator 28 and end cap 34 placed adjacent end wall 14 so that the gas diffusing end of inflator 28 is adjacent opening 62. The other end 31 of cylindrical inflator 28 is adjacent end wall 16 and opening 63 therein. Stud bolts 60 are placed into the openings or holes 70 in canister floor 22, so as to protrude therethrough, and suitable locking elements 94, such as nuts, are threaded thereon to fixedly secure the subassembly in the reaction canister 12. A suitable deceleration sensor (not shown) may be electrically connected by vehicle circuitry to male terminals 76 of the inflator 28 through opening 62 in end wall 14. This sensor will cause activation of the inflator igniter in the event of a rapid deceleration above a set rate, causing activation of the inflator 28 and deployment of airbag 26. The other end 31 of inflator 28 adjacent opening 63 in end wall 16 is available for attachment of a low pressure sensor (not shown) to the inflator for monitoring the ambient pressure within the inflator. When the low pressure sensor detects that ambient pressure in inflator 28 is insufficient, the airbag inflator can be replaced with considerable ease. The inflator 28 and end cap 34 subassembly can quickly be detached from the module diffuser housing 54 by releasing locking tab 50 and withdrawing the inflator-end cap unit from the housing and replacing it with a new inflator-end cap unit.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. An airbag module assembly for use in a vehicle which comprises:

a reaction canister in the shape and form of a trough having a floor, spaced first and second sidewalls and first and second end walls defining an open mouth for deployment of an airbag;

a substantially cylindrical inflator longitudinally positioned within the trough of said canister between said end walls, one end of said inflator being a gas diffusing end, said gas diffusing end oriented towards said first end wall, the other end of said inflator being oriented towards the second end wall;

an end cap having an essentially centrally located orifice, said orifice being fixedly attached to the diffusing end of said inflator, said end cap abutting an inner surface of said first end wall;

a module diffuser housing substantially encircling said inflator lengthwise along said canister, and being releasably, lockably secured to the end cap and fixedly secured to the reaction canister; and an inflatable airbag positioned in the reaction canister to receive inflation gas from said inflator.

2. An airbag module assembly according to claim 1, wherein the inflator is a hybrid inflator.

3. An airbag module assembly according to claim 2, wherein said end cap comprises:

a planar surface with a top and bottom side;

a skirted surface extending in a perpendicular direction to said top and bottom sides and peripherally surrounding said planar surface, and said orifice located essentially centrally in said planar surface for receiving and being fixedly attached to the diffusing end of said inflator.

4. An airbag module assembly according to claim 3, wherein said end cap has a plurality of projections on the skirted surface, which projections protrude radially outwardly from and transverse to the skirted surface of said end cap and at least one of said projections is a locking tab releasably, lockably securing the end cap to a mating securing opening in said module diffuser housing.

5. An airbag module assembly according to claim 4, wherein one or more of said projections is a positioning tab engaging an edge of the module diffuser housing, for positioning and retaining said locking tab in said mating securing opening of said module diffuser housing.

6. An airbag module assembly according to claim 5, wherein said orifice in the planar surface of the end cap is a peripherally cupped circular orifice in which the cupping extends in the same direction as said skirted surface, but tapers radially inwardly and is fixably secured to the gas diffusing end of said inflator.

7. An airbag module assembly according to claim 6, wherein said end cap is substantially hexagonal in shape and a first portion of its skirted surface conforms in shape to the trough shape of said first sidewall, said second sidewall, and said floor of the reaction canister and a second portion of its skirted surface conforms to a portion of a hexagonal end shape of said module diffuser housing.

8. An airbag module assembly according to claim 7, wherein said module diffuser housing is fixably attached to said floor.

9. An airbag module assembly according to claim 3, wherein said end cap is substantially hexagonal in shape and a first portion of its skirted surface conforms in shape to the trough shape of said first sidewall, said second sidewall, and said floor of the reaction canister and a second portion of its skirted surface conforms to a portion of a hexagonal end shape of said module diffuser housing.

10. An airbag module assembly according to claim 2, wherein said module diffuser housing is fixably attached to said floor.

11. An airbag module assembly according to claim 1, wherein said module diffuser housing is fixably attached to said floor.

12. In an airbag module assembly comprising a reaction canister, having positioned therein an inflator enclosed by a module diffuser housing, and an inflatable airbag, the improvement comprising:

an end cap fixedly attached to one end of the inflator and releasably lockably secured to a securing opening on the module diffuser housing by a locking tab on the end cap, said module diffuser housing being fixably secured to the reaction canister by attachment means.

13. An airbag module assembly according to claim 12 wherein the inflator is a hybrid airbag inflator.

14. An airbag module assembly for use in a vehicle which comprises:

a reaction canister in the shape and form of a trough having a floor, spaced first and second sidewalls and first and second end walls defining an open mouth for deployment of an airbag;

a substantially cylindrical hybrid inflator longitudinally positioned within the trough of said canister between said end walls, one end of said inflator being a gas diffusing end, said gas diffusing end oriented towards said first end wall, an other end of said inflator oriented toward said second end wall;

a generally hexagonally shaped module diffuser housing substantially encircling said inflator lengthwise along said canister, said housing having a plurality of outlet openings for distribution of inflation gases from the inflator and at least one securing opening;

a substantially hexagonally shaped end cap fixedly attached to the diffusing end of said inflator and abutting an inner surface of said first end wall, said end cap having a planar surface with top and bottom faces, a skirted surface extending in a perpendicular direction to said top and bottom faces and peripherally surrounding said planar surface, said skirted surface conforms in shape to the shape of an end of the module diffuser housing, a peripherally cupped orifice located essentially centrally in said planar surface, the cup of said cupped orifice extending in the same direction as the direction of said skirted surface and being tapered radially inward for receiving and being fixedly attached to the diffusing end of said inflator, said end cap having a plurality of projections which protrude radially outwardly from and transversely to the skirted surface, wherein, at least one of said projections is a locking tab mating with the securing opening of said module diffuser housing for releasably securing the end cap in an end of said module diffuser housing, and one or more of said projections is a positioning tab engaging an edge of the module diffuser housing maintaining alignment of the end cap with respect to an end of said module diffuser housing positioning and retaining said locking tab in said securing opening of said module diffuser housing, and an inflatable airbag positioned in the open mouth of said reaction canister, said airbag having a mouth opening to receive inflator gas from said inflator.

15. An airbag module assembly for use in a vehicle which comprises:

a reaction canister in the shape and form of a trough having a floor, spaced first and second sidewalls and first and second end walls defining an open mouth for deployment of an airbag;

a substantially cylindrical inflator longitudinally positioned within the trough of said canister between said end walls, one end of said inflator being a gas diffusing end, said gas diffusing end oriented towards said first end wall, an other end of said inflator oriented toward said second end wall;

a module diffuser housing substantially encircling said inflator lengthwise along said canister;

a shaped end cap fixedly attached to the diffusing end of said inflator and abutting an inner surface of said first end wall, said end cap having a planar surface with top and bottom faces, a skirted surface extending in a perpendicular direction to said top and bottom faces and peripherally surrounding said planar surface, an orifice located essentially centrally in said planar surface for receiving and being fixedly attached to the diffusing end of said inflator, said end cap having a plurality of projections which protrude radially outwardly from and transversely to the skirted surface of the end cap, said module diffuser housing being lockably secured to the end cap; and an inflatable airbag positioned in said reaction canister to receive inflator gas from said inflator.

16. An airbag module assembly according to claim 15, wherein at least one of said projections is a locking tab releasably, lockably securing the end cap to a mating securing opening in said module diffuser housing.

17. An airbag module assembly according to claim 16, wherein one or more of said projections is a positioning tab engaging an edge of the module diffuser housing, for positioning and retaining said locking tab in said mating securing opening of said module diffuser housing.

18. An airbag module assembly according to claim 17, wherein said orifice in the planar surface of the end cap is a peripherally cupped circular orifice in which the cupping extends in the same direction as said skirted surface, but tapers radially inwardly and is fixably secured to the gas diffusing end of said inflator.

19. An airbag module assembly according to claim 18, wherein said end cap is substantially hexagonal in shape and a first portion of its skirted surface conforms in shape to the trough shape of said first sidewall, said second sidewall, and said floor of the reaction canister and a second portion of its skirted surface conforms to a portion of a hexagonal end shape of said module diffuser housing.

20. An airbag module assembly according to claim 19, wherein said module diffuser housing is fixably attached to said floor.

* * * * *